(12) United States Patent
Liu (10) Patent No.: US 7,508,412 B2
(45) Date of Patent: Mar. 24, 2009

(54) PORTABLE ELECTRONIC DEVICE AND VIDEO CONFERENCE SYSTEM INTEGRATED WITH THE SAME

(75) Inventor: Wan-Hsieh Liu, Hsintien (TW)

(73) Assignee: HTC Corporation, Taoyuan (TW)

( * ) Notice: Subject to any disclaimer, the term of this patent is extended or adjusted under 35 U.S.C. 154(b) by 730 days.

(21) Appl. No.: 11/120,997

(22) Filed: May 4, 2005

(65) Prior Publication Data

US 2006/0055770 A1 Mar. 16, 2006

(30) Foreign Application Priority Data

Sep. 15, 2004 (TW) .............................. 93127927 A (51) Int. Cl.
*H04N 7/14* (2006.01)
*H04L 12/66* (2006.01)
(52) U.S. Cl. ............... 348/14.02; 348/14.04; 348/14.01
(58) Field of Classification Search ... 348/14.01–14.16; 725/153, 141; 370/352, 329

See application file for complete search history.

(56) References Cited

U.S. PATENT DOCUMENTS

| 6,760,804 | B1 * | 7/2004 | Hunt et al. | 710/313 |
| 2002/0041589 | A1 * | 4/2002 | Novak et al. | 370/352 |
| 2002/0066115 | A1 * | 5/2002 | Wendelrup | 725/153 |
| 2004/0207719 | A1 * | 10/2004 | Tervo et al. | 348/14.02 |

* cited by examiner

*Primary Examiner*—Melur Ramakrishnaiah
(74) *Attorney, Agent, or Firm*—Rabin & Berdo, PC (57) ABSTRACT

A portable electronic device and a video conference system integrated with the portable electronic device are described. The video conference system has a portable electronic device, a computer, and a display. The portable electronic device generates first video data. The computer receives second video data and second voice data from a remote electronic device. The computer receives the first video data through a transmission interface. The computer has an audio-receiving device for receiving an audio signal and generating first audio data. The display receives and displays the second video data. The computer displays the second audio data and sends the first video data and the first audio data to the remote electronic device through a network transmission medium, so that a video conference is conducted.

6 Claims, 6 Drawing Sheets

PORTABLE ELECTRONIC DEVICE AND VIDEO CONFERENCE SYSTEM INTEGRATED WITH THE SAME

RELATED APPLICATIONS

The present application is based on, and claims priority from, Taiwan Application Serial Number 93127927, filed Sep. 15, 2004, the disclosure of which is hereby incorporated by reference herein in its entirety.

BACKGROUND

1. Field of Invention

The present invention relates to a portable electronic device and a video conference system. More particularly, the present invention relates to a portable electronic device and a video conference system where the image-capturing module of the portable electronic device is used to perform the video conference.

2. Description of Related Art

Conventionally, a cell phone is mainly used for communication. A PDA (personal digital assistant) is a device for storing and processing personal data. With the advance of digital image technology, camera modules have been integrated into some modern cell phones and PDAs. Pictures taken by such a camera module can be sent to a remote participant.

Some cell phones, such as some wireless LAN, CDMA, or WCDMA, have a high transmission speed. These cell phones can hold video conferences when communicating with another participant. However, the screens on cell phones are usually very small. If the video conference has many participants, the participants are hard to see since the image resolution is not good. A conventional video conference conducted by cell phones also lacks sufficient resolution for displaying documents, data papers, pictures, or products during the video conference. Besides, holding a video conference over a wireless connection is costly.

With the development of network technology, information exchange through the Internet has become very common and convenient. The video and audio data compression technology is also developing fast. Therefore, it is possible to transfer video and audio data via the Internet if the bandwidth is high enough.

Conventionally, a camera and a microphone have to be added to a computer in order to perform a video conference. The connection is established through the Internet and a real-time video and audio communications are made.

However, in a video conference held in this manner, the computer and the cell phone (or PDA) cannot be linked efficiently, or a link may not even exist in the video conference. If a cell phone already has a video conference function, buying another video conference system on a computer is wasteful.

SUMMARY

It is therefore an objective of the present invention to provide a conference system that can use the image-capturing module of a portable electronic device connected to a computer to hold a video conference.

It is another objective of the present invention to provide a video conference system, where the cost of adding an extra camera to perform a video conference is saved by using the image-capturing module of a portable electronic device.

It is still another objective of the present invention to provide a video conference system that can show the conference video on the display of a computer rather than showing it on the portable electronic device, so that the image size is larger and the resolution is better.

It is still another objective of the present invention to provide a portable electronic device, where when the portable electronic device is connected to a computer, the image-capturing module of the portable electronic device can cooperate with the computer to perform a video conference.

It is still another objective of the present invention to a provide portable electronic device, where in a video conference, the portable electronic device can send the conference video to a computer and the conference video can be displayed on the display of the computer, so that the image size is enlarged and the resolution is improved.

It is still another objective of the present invention to provide a portable electronic device, where in a video conference involving more than three participants, the video conference system provides three links for the three participants. One participant is connected through a wireless link, and the other two participants are connected through other network transmission media.

In accordance with the foregoing and other objectives of the present invention, a portable electronic device and a conference system integrated with the portable electronic device are described. According to one embodiment of the invention, the conference system includes a portable electronic device, a computer, and a display.

The portable electronic device has an image-capturing module and a display module. The portable electronic device captures a scene and generates first video data.

The computer receives second video data and second audio data through a network transmission medium. The second video data and the second audio data are generated by a remote electronic device. The computer receives the first video data through a transmission interface. The computer has an audio-receiving device for receiving an audio signal and generating first audio data. The display is connected to the computer. The display receives and displays the second video data.

When the display displays the second video data, the computer plays the second audio data and sends the first video data and the first audio data to the remote electronic device through the network transmission medium, so as to hold a video conference. When the portable electronic device is not connected to the computer, the portable electronic device is capable of displaying the first video data on the display module.

The portable electronic device is, for example, a cell phone or a PDA. The transmission interface is, for example, a USB interface, an IEEE 1394 interface, an IEEE 802.11b/a/g, or a UART interface. The network transmission medium is, for example, ADSL, EtherNet, WLAN or ISDN.

In accordance with the foregoing and other objectives of the present invention, a portable electronic device is described. According to one embodiment of the invention, the portable electronic device includes an image-capturing module, a display module, and a wireless signal transceiver module.

The portable electronic device uses the image-capturing module to capture a scene and generates first video data. When the portable electronic device is connected to a computer through a transmission interface, and when the portable electronic device receives second video data and second audio data through the wireless signal transceiver module, the portable electronic device sends the second video data to the computer through the transmission interface. The second video data is displayed on a display of the computer. The second video data and the second audio data come from a remote electronic device.

The portable electronic device sends the first video data to the remote electronic device through the wireless signal transceiver module, so as to hold a video conference. When the portable electronic device is not connected to the computer, the portable electronic device is capable of displaying the first video data on the display module.

The invention has at least the following advantages. Each embodiment can present one or more advantages. The invention provides a conference system that uses the image-capturing module of a portable electronic device connected to a computer to hold a video conference. The cost of adding an extra camera to perform a video conference is saved by using the image-capturing module of a portable electronic device. The invention provides a video conference system that shows the conference video on the display of a computer rather than showing it on the portable electronic device, so the image size is larger and the resolution is better. When the portable electronic device is not connected to a computer, the portable electronic device can operate independently, such as performing the inherent functions of a cell phone or a PDA.

It is to be understood that both the foregoing general description and the following detailed description are examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
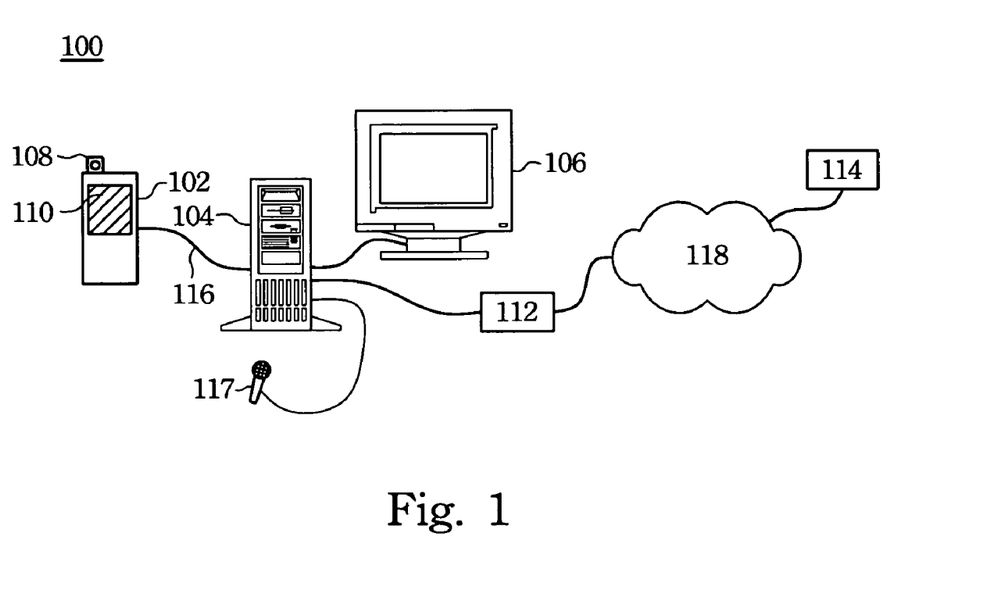
FIG. 1 is a diagram illustrating an embodiment of a video conference system according to the invention.

FIG. 1 is a diagram illustrating an embodiment of a video conference system according to the invention. With reference to FIG. 1, the video conference system 100 includes a portable electronic device 102, a computer 104 and a display 106.

The portable electronic device 102 has an image-capturing module 108 and a display module 110. The portable electronic device 1012 uses the image-capturing module 108 to capture a scene and generate first video data.

The computer 104 receives second video data and second audio data through a network transmission medium 112. The second video data and the second audio data are generated by a remote electronic device 114. The computer 104 receives first video data through a transmission interface 116. The computer 104 has an audio-receiving device 117 for receiving an audio signal and generating first audio data. The display 106 is connected to the computer 104. The display 106 receives and displays the second video data. The computer 104 also can receive and play audio data.

When the display 106 displays the second video data, the computer 104 plays the second audio data and sends the first audio data to the remote electronic device 114 through the network transmission medium 112, so as to hold a video conference. When the portable electronic device 102 is not connected to the computer 104, the portable electronic device 102 is capable of displaying the first video data on the display module 110.

In one embodiment, the portable electronic device 102 is, for example, a cell phone or a PDA (personal digital assistant). In a video conference, video data (the second video data) and audio data (the second audio data) of a remote participant need to be displayed by a local computer or electronic device. Meanwhile, video data (the first video data) and audio data (the first audio data) of a local participant have to be sent to the remote participant.

Conventionally, a camera is added to the computer 104 to capture the image (or video) of a local participant to generate first video data. In this invention, no extra camera needs to be added to the computer 104. Only a portable electronic device 102 having an image capturing function is connected to the computer 104, and a video conference function can be achieved.

In one embodiment, a cell phone with a image-capturing function is used as the portable electronic device 102. The portable electronic device 102 is connected to the computer 104 through the transmission interface 116. The transmission interface 116 is, for example, a USB interface, an IEEE 1394 interface, an IEEE 802.11b/a/g, or a UART interface.

The image-capturing module 108 of the portable electronic device 102 is used to capture the image (or video) of a local participant and generate first video data. The first video data is sent to the computer 104. The image-capturing module 108 is, for example, a CCD or CMOS camera. The computer 104 sends the first video data through a network transmission medium 112 and the Internet 118 to the remote electronic device 114. The network transmission medium 112 is, for example, an ADSL, EtherNet, WLAN, or ISDN. The remote electronic device 114 is, for example, a computer or a cell phone. In one embodiment, an audio-receiving device 117 is used to receive an audio signal from a local participant and generate the first audio data. The audio-receiving device 117 is, for example, a microphone connected to the computer 104.

In another embodiment, the audio-receiving device 117 is integrated into the portable electronic device 102, such as the audio receiving portion of a cell phone. The first audio data generated by the audio-receiving device 117 can be sent to the remote electronic device 114 via the portable electronic device 102, the transmission interface 116, the computer 104, the network transmission medium 112, and the Internet 118.

In a video conference, the remote electronic device 114 needs to capture video data (the second video data) and the audio data (the second audio data) of the remote participant. The second video data and the second audio data are sent to the computer 104 through the Internet 118 and the network transmission medium 112. The second video data can be displayed on the display 106, so that the local participant can see the image of the remote participant. The second audio data can also be played by the computer 104 synchronously to perform the video conference.

In one embodiment, the first video data is sent to both the remote electronic device 114 and the display 106. At this time, the display 106 shows both images of the local participant and the remote participant. The voice (the first audio data) of the local participant and the voice (the second audio data) of the remote participant can be simultaneously played on the computer 104.

When the portable electronic device 102 is not connected to the computer 104, the portable electronic device 102 can operate independently. For example, the communication and image capturing functions of a cell phone can still work when not connected to the computer 104. The data arrangement and camera functions of a PDA can also work when not connected to the computer 104. The portable electronic device 102 can use its display module 110 independently.

Figure 2:
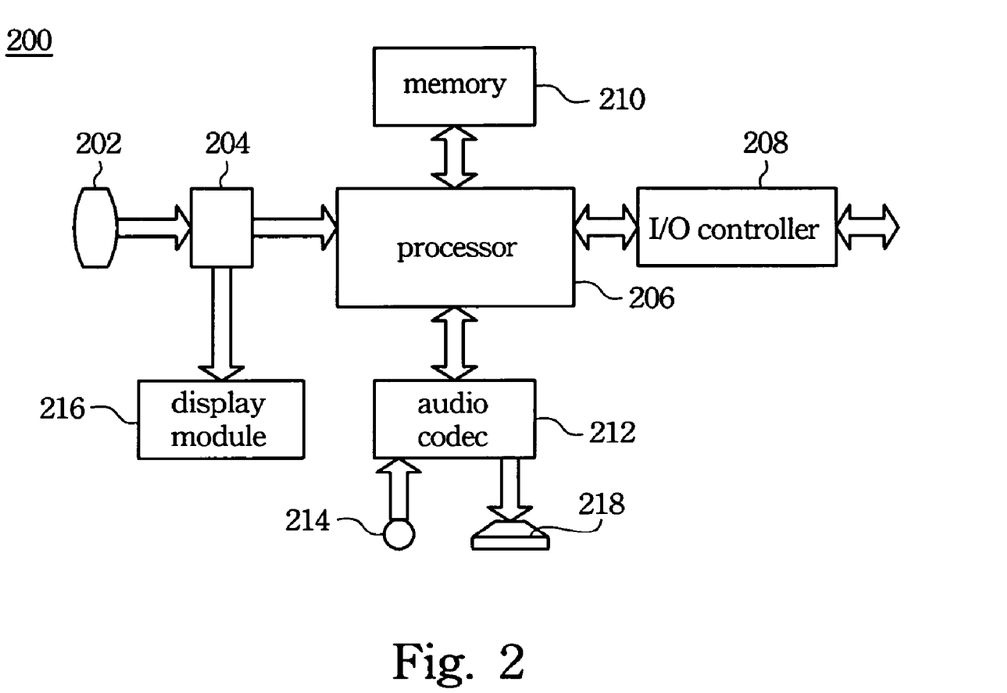
FIG. 2 is a structure diagram of the portable electronic device according to one embodiment of the invention.

FIG. 2 is a structure diagram of the portable electronic device according to one embodiment of the invention. With reference to FIG. 2, the portable electronic device 200 is, for example, a PDA. The image-capturing module 202 captures the image (or video) of the local participant and an image processor 204 performs an image processing to generate the first video data. The first video data can be displayed on the display module 216.

A processor 206 controls and coordinates an I/O controller 208, a memory 210, and an audio codec 212. The processor 206 sends the first video data through the I/O controller 208 to a computer (not shown). The ways of sending the first video data can be through USB, IEEE 1394, or UART.

The portable electronic device 200 can have an audio-receiving device 214, such as a microphone. The audio-receiving device 214 receives the audio signal from the local participant. Then, the audio signal is compressed, by the audio codec 212, into a first audio signal. The processor 206 sends the first audio signal to a computer (not shown) through the I/O controller 208. The the first audio signal can be sent through USB, IEEE 1394, or UART.

After the I/O controller 208 receives the audio signal (the second audio signal) coming from a remote participant, the processor 206 sends the second audio signal to the audio codec 212 and the audio codec 212 decodes the second audio signal. After decoding, the second audio signal is played by the speaker 218.

Therefore, referring to FIG. 1 and FIG. 2, a video conference function can be achieved by connecting the portable electronic device 200 having the image-capturing module 202 to a computer with proper transmission interface 116. The portable electronic device 200 keeps its original functions and can operate independently. Moreover, in a video conference, an extra camera is not needed because of the image-capturing module 202 of the portable electronic device 200. Thus, the portable electronic device 200 has multiple functions.

Figure 3:
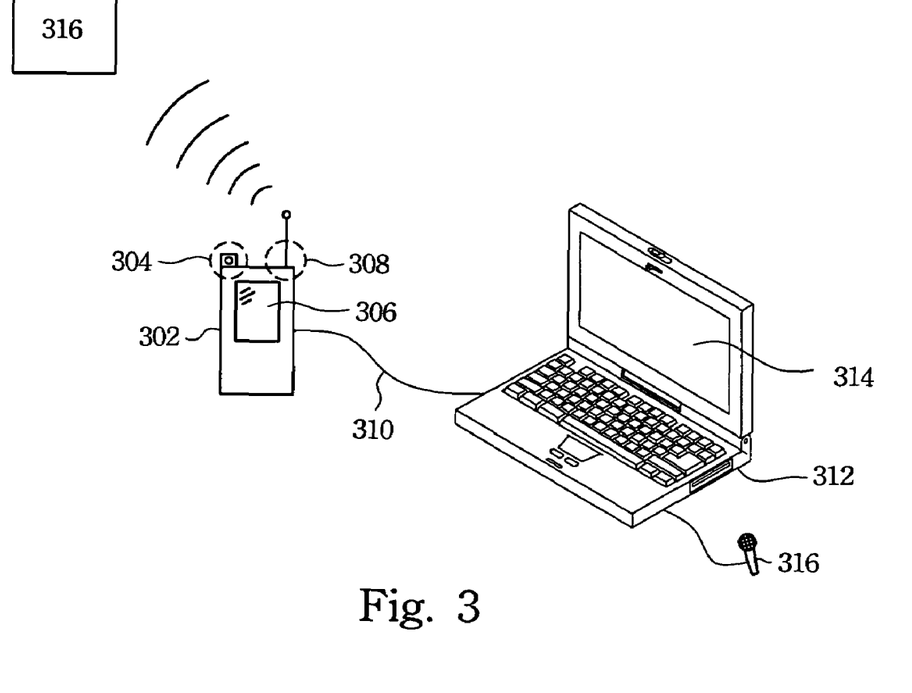
FIG. 3 is a diagram illustrating another embodiment according to the invention.

FIG. 3 is a diagram illustrating another embodiment according to the invention. With reference to FIG. 3, the portable electronic device 302 includes an image-capturing module 304, a display module 306, and a wireless signal transceiver module 308. The portable electronic device 306 uses the image-capturing module 304 to capture a scene to generate first video data.

When the portable electronic device 302 is connected to a computer 312 through a transmission interface 310, and when the portable electronic device 302 receives second video data and second audio data through the wireless signal transceiver module 308, the portable electronic device 302 sends the second video data to the computer 312 through the transmission interface 310, so the second video data can be displayed on the display 314 of the computer 312. The second video data and the second audio data come from a remote electronic device 316.

The portable electronic device 302 sends the first video data to the remote electronic device 316 via the wireless signal transceiver module 308 and performs a video conference. When the portable electronic device 302 is not connected to the computer 312, the portable electronic device 302 is capable of displaying the first video data on the display 306.

In one embodiment, when the portable electronic device 302 is not connected to the computer 312, the portable electronic device 302 can hold a video conference with a remote electronic device 316 by sending wireless signals through the wireless signal transceiver module 308. However, the display module 306 on the portable electronic device 302 is usually small, and cannot display a great number of pixels provided by the image-capturing module 304. The portable electronic device is, for example, a cell phone or a PDA.

For example, the image-capturing module 304 can provide an image over 1 million pixels, but the display module 306, limited by its area, usually can only display a 640*480 image (or smaller). Therefore, it cannot provide the best resolution. When more than one person needs to appear on the image, or when details of a product, a picture, or a design need to be shown, the small image size causes problems.

Therefore, connecting the portable electronic device 302 to the computer 312 through a proper transmission interface 310 and showing the image (or video) on the display 314 of the computer 312 instead of showing the image on the display module 306 resolves the problems mentioned above.

The remote participant uses the remote electronic device 316 and transmits the video signal (the second video signal) and the audio signal (the second audio signal) of the remote participant to the portable electronic device 302 by way of wireless communication. The portable electronic device 302 receives the second video signal and the second audio signal through the wireless signal transceiver module 308 and then sends the second video signal and the second audio signal to the computer 312 through the transmission interface 310, so that the second video signal and the second audio signal can be displayed (or played) by the computer 312.

Because the size of the display 314 of the computer 312 is much larger than that of the display module 306, a greater amount of pixels and a better resolution are provided. A great amount of pixels and a better resolution are essential to the quality of a video conference. The computer 312 is also able to receive the video data (the first video data) from the local participant and display the first video data on the display 314.

The audio data (the second audio data) of the remote participant can be played by a built-in speaker. The audio data can also be sent to the computer 312 through the transmission interface 310 and then be played by the speaker of the computer 312. The image-capturing module 304 of the portable electronic device 302 captures the image (or video) of the local participant and generates the first video data. The first video data is then sent to the remote participant through the wireless signal transceiver module 308.

In one embodiment, the portable electronic device 302 has an audio-receiving device for receiving the audio signal generated by the local participant and then generating first audio data. The portable electronic device 302 sends the first audio data to the remote electronic device 316 through the wireless signal transceiver module 308.

In another example, the computer 312 has an audio-receiving device 316 for receiving the audio signal from the local participant and generating first audio data. The computer 312 sends the first audio data to the portable electronic device 302 through the transmission interface 310. The portable electronic device 302 then sends the first audio data to the remote electronic device 316 through the wireless signal transceiver module 308. The transmission interface is, for example, a USB interface, an IEEE 1394 interface, or a UART interface.

Figure 4:
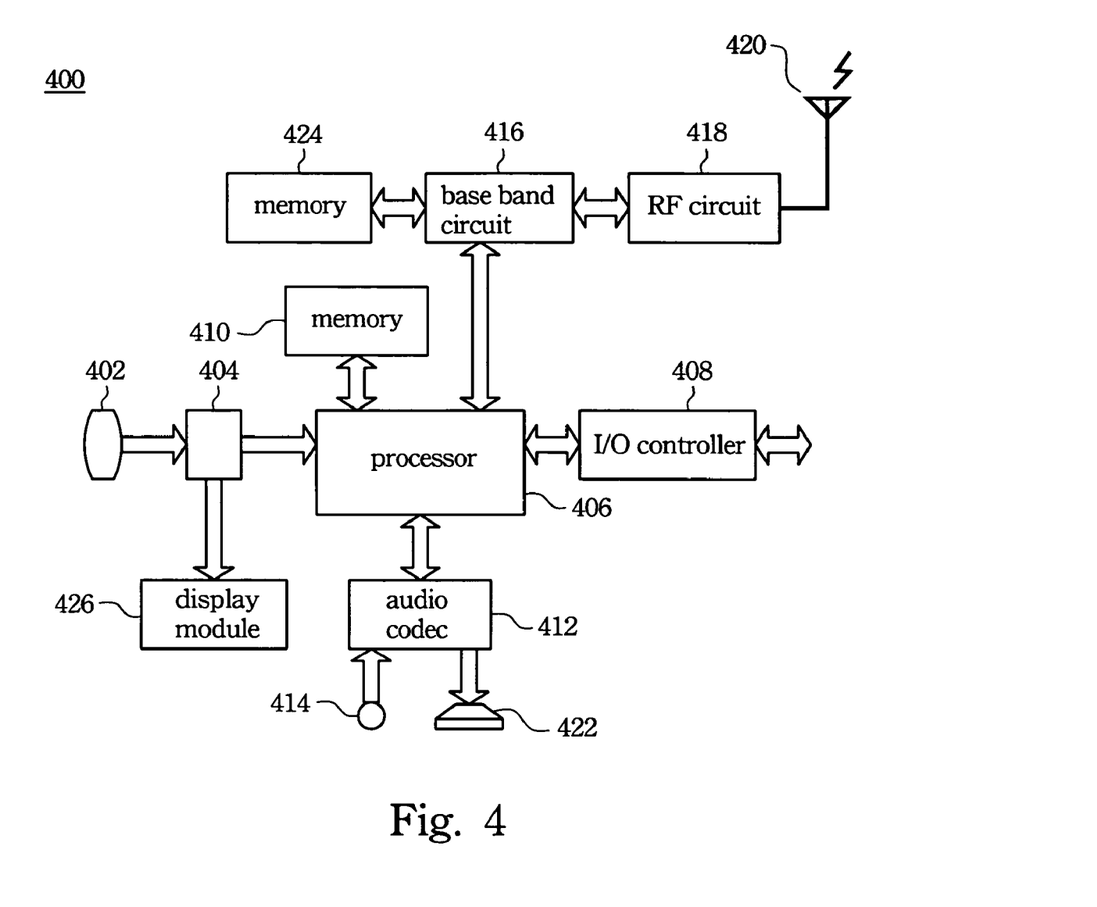
FIG. 4 is a diagram illustrating a structure of the portable electronic device according to one embodiment of the invention.

FIG. 4 is a diagram illustrating a structure of the portable electronic device according to one embodiment of the invention. With reference to FIG. 4, the portable electronic device 400 is, for example, a cell phone. The portable electronic device 400 can be used in the embodiment shown in FIG. 3. The image-capturing module 402 captures the scene of the local participant and generates a video signal. The video signal is processed by an image processor 404 and then a first video signal is generated by the image processor 404. The first video signal can be displayed on a display module 426.

A processor 406 controls and coordinates a I/O controller 408, a memory 410, and an audio codec 412. The processor 406 sends the first video signal to a base band circuit 416. The first video data is then sent to a remote participant through an RF circuit 418 and an antenna 420. The memory 424 can be used by the base band circuit 416.

The portable electronic device 400 can have an audio-receiving device 414, such as a microphone. The audio-receiving device 414 receives the audio signal from the local participant. The audio signal is then compressed, by the audio codec 412, into a first audio signal. The processor 406 sends the first audio signal to the base band circuit 416. Then, the first audio signal is sent to the remote participant through the RF circuit 418 and the antenna 420.

When the video signal (the second video signal) of a remote participant is received via the antenna 420, the RF circuit 418, and the base band circuit 416, the processor 406 sends the second video signal to a computer (not shown) through the I/O controller 408. Thus, a bigger computer display is used to show the second video signal.

When the audio signal (the second audio signal) of a remote participant is received via the antenna 420, the RF circuit 418, and the base band circuit 416, the processor 406 sends the second audio signal to the audio codec 412. The second audio signal is then decoded by the audio codes 412 and the decoded second audio signal is played by the speaker 422.

In another embodiment, the processor 406 sends the second audio signal to a computer (not shown) through the I/O controller 408 and the second audio signal is played by the speaker of the computer.

Figure 5:
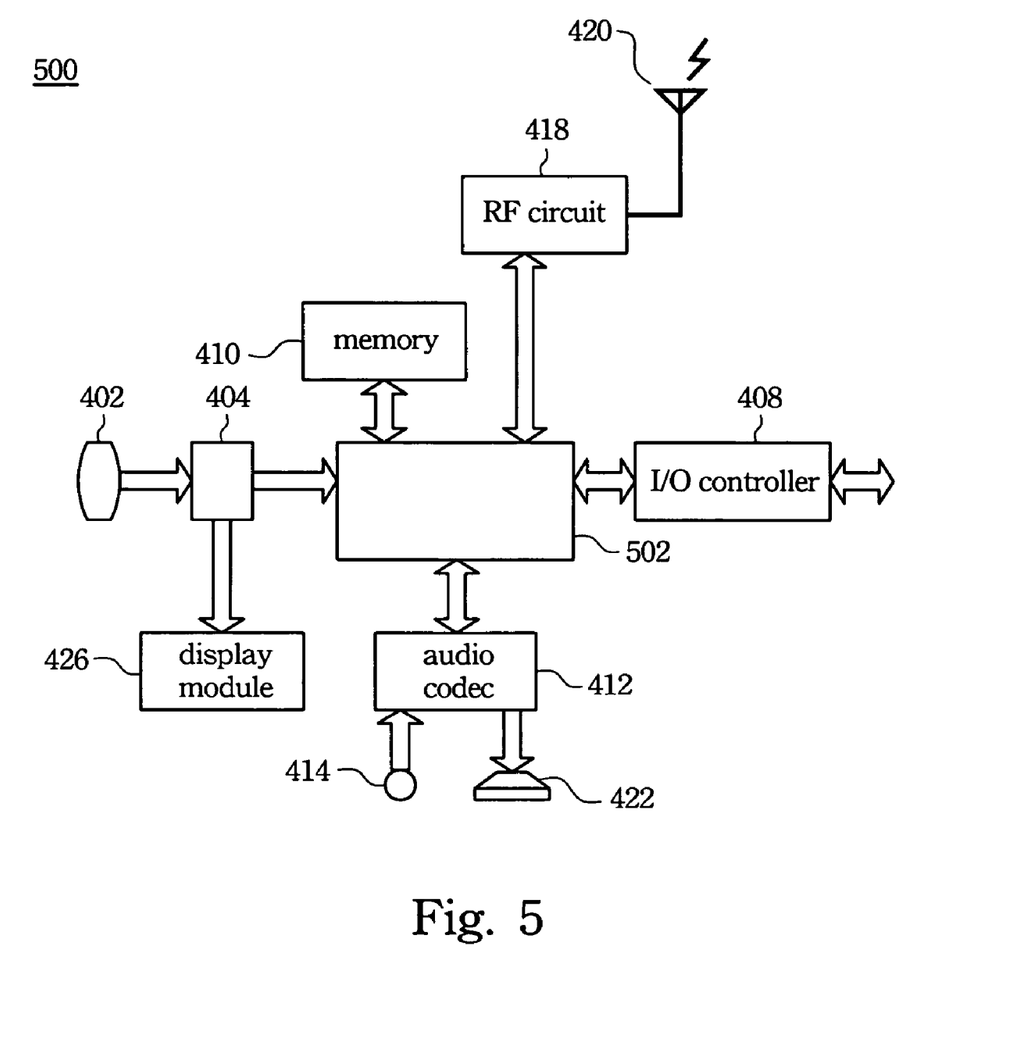
FIG. 5 is a diagram illustrating a structure of the portable electronic device according to one embodiment of the invention.

FIG. 5 is a diagram illustrating a structure of the portable electronic device according to one embodiment of the invention. With reference to FIG. 5, the structure of the portable electronic device 500 is similar to that of the portable electronic device 400 in FIG. 4. The difference between the portable electronic device 500 and 400 is that the portable electronic device 500 integrates the base band circuit and the processor into a chip 502, whereas the portable electronic device 400 separates the base band circuit 416 and the processor 406. In the portable electronic device 500, the processing of the first video data, the first audio data, the second video data, and the second audio data are the same as the processing used in the portable electronic device 400.

Figure 6A:
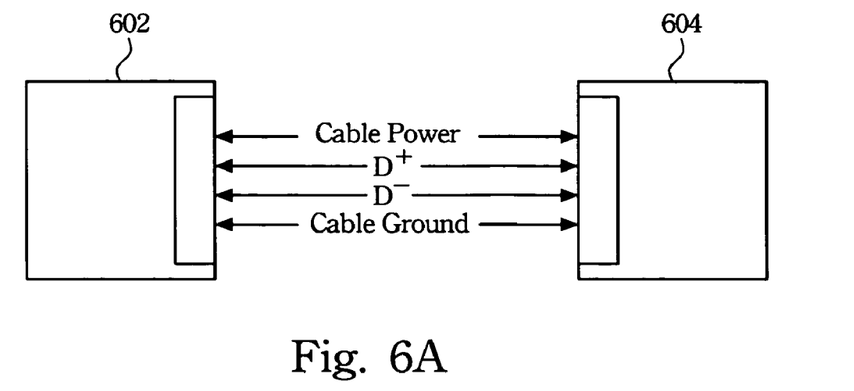
FIG. 6A shows the use of USB as an example of a transmission interface.
Figure 6B:
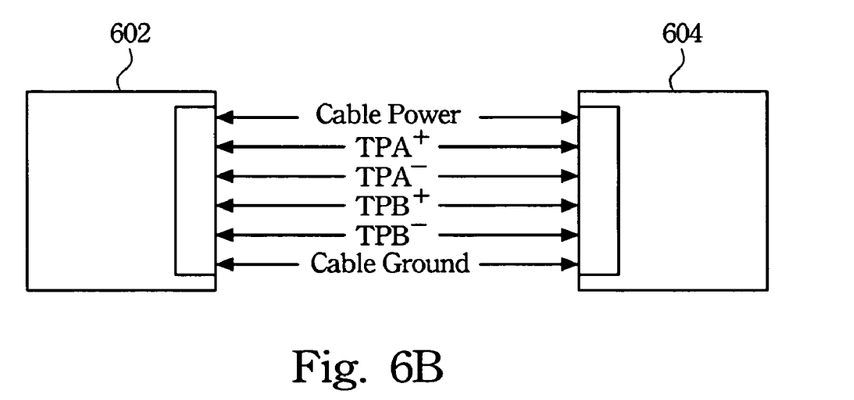
FIG. 6B shows the use of IEEE as an example of a transmission interface.
Figure 6C:
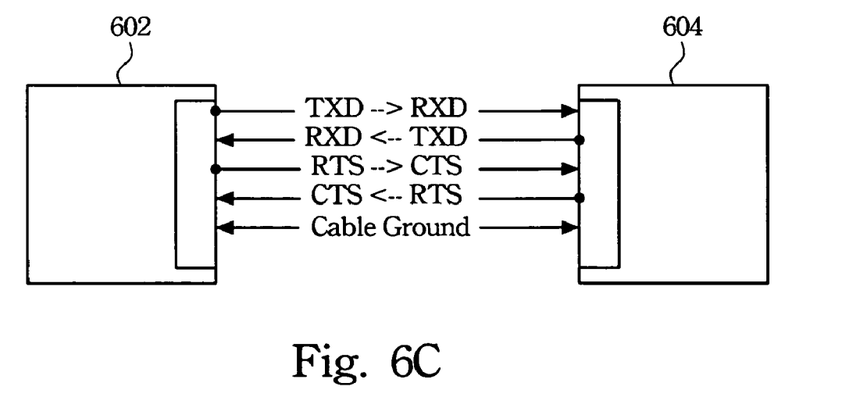
FIG. 6C shows the use of UART as an example of a transmission interface.

FIG. 6A shows the use of USB as an example of a transmission interface. FIG. 6B shows the use of IEEE 1394 as an example of a transmission interface. FIG. 6C shows the use of UART as an example of a transmission interface.

In FIG. 6A, USB (Cable Power, D+, D−, Cable Ground) is used as the transmission protocol between the portable electronic device 602 and the computer 604. In FIG. 6B, IEEE 1394 (Cable Power, TPA+, TPA−, TPB+, TPB−, Ground Cable) is used as the transmission protocol between the portable electronic device 602 and the computer 604. In FIG. 6C, UART (TXD->RXD, RXD-<TXD, RTS->CTS, CTS-<RTS, Cable Ground) is used as the transmission protocol between the portable electronic device 602 and the computer 604.

Any one of the transmission protocols shown in FIG. 6A, 6B, and 6C can be used as a transmission protocol between the portable electronic device and the computer for the video conference.

The invention has at least the following advantages. Each embodiment can present one or more advantages. Taking the embodiment in FIG. 1 as an example, the image-capturing module 108 of the portable electronic device 102 connected to the computer 104 can be used to hold a video conference. The cost of adding an extra camera to perform a video conference is saved by using the image-capturing module 108 of the portable electronic device 102. The invention provides a video conference system that can show the conference video on the display 106 of the computer 104 rather than showing it on the portable electronic device 102, so the image size is larger and the resolution is better. When the portable electronic device 102 is not connected to the computer 104, the portable electronic device 102 can operate independently, performing the inherent functions of, for example, a cell phone or a PDA.

Although the present invention has been described in considerable detail with reference to certain preferred embodiments thereof, other embodiments are possible. Therefore, their spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device for video conferencing, the portable electronic device comprising:

an image-capturing module for capturing a scene and generating first video data;

a display module; and a wireless signal transceiver module, wherein, when the portable electronic device is connected to a computer through a transmission interface, and when the portable electronic device receives second video data and second audio data through the wireless signal transceiver module, the portable electronic device sends the second video data to the computer through the transmission interface, the second video data is displayed on a display of the computer, and the second video data and the second audio data come from a remote electronic device;

wherein the portable electronic device sends the first video data to the remote electronic device through the wireless signal transceiver module, so as to hold a video conference; and wherein, when the portable electronic device is not connected to the computer, the portable electronic device is capable of displaying the first video data on the display module.

2. The portable electronic device of claim 1, wherein the portable electronic device is a cell phone or a PDA.

3. The portable electronic device of claim 1, wherein the portable electronic device sends the first video data to the computer, and the computer displays the first video data on the display of the computer.

4. The portable electronic device of claim 1, wherein the computer further comprises an audio-receiving device for receiving an audio signal and generating first audio data, the computer sends the first audio data to the portable electronic device through the transmission interface, and the portable electronic device sends the first audio data to the remote electronic device through the wireless signal transceiver module.

5. The portable electronic device of claim 1, further comprising an audio-receiving device for receiving an audio signal and generating first audio data, wherein the portable electronic device sends the first audio data to the remote electronic device through the wireless signal transceiver module.

6. The portable electronic device of claim 1, wherein the transmission interface is a USB interface, an IEEE 1394 interface, or a UART interface.

* * * * *